(12) United States Patent
Stowell et al.

(10) Patent No.: US 6,207,295 B1
(45) Date of Patent: Mar. 27, 2001

(54) ARTICLE WITH TAILORABLE HIGH TEMPERATURE COATING

(75) Inventors: William R. Stowell, Rusing Sun, IN (US); Ching-Pang Lee, Cincinnati, OH (US); John F. Ackerman, Laramie, WY (US); George A. Durgin, West Chester; Robert W. Harris, Cincinnati, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/353,031

(22) Filed: Jul. 13, 1999

(51) Int. Cl.[7] .............................. B32B 15/00; B32B 15/04
(52) U.S. Cl. .................. 428/615; 428/627; 428/641; 428/655; 428/663; 428/664
(58) Field of Search ........................... 428/615, 621, 428/623, 632, 633, 650, 668, 670, 678, 680, 469, 472, 472.2; 416/241 R, 241 B

(56) References Cited

U.S. PATENT DOCUMENTS

| | | | |
|---|---|---|---|
| 5,503,527 | | 4/1996 | Lee et al. ............................. 416/91 |
| 5,503,874 | * | 4/1996 | Ackerman et al. ................. 427/237 |
| 5,627,426 | | 5/1997 | Whitman et al. .................... 313/116 |
| 5,693,368 | * | 12/1997 | Ackerman et al. ................. 427/253 |
| 5,849,416 | * | 12/1998 | Coffinberry et al. ............... 428/447 |
| 5,851,679 | * | 12/1998 | Stowell et al. ..................... 428/472 |

* cited by examiner

Primary Examiner—Timothy M. Speer
Assistant Examiner—Bryant Young
(74) Attorney, Agent, or Firm—Andrews C. Hess; David L. Narciso

(57) ABSTRACT

A coated article comprises a substrate, an inner environmental resistant coating portion including Al on the substrate, and an outer heat energy reflecting and oxygen diffusion inhibiting coating portion outward of the inner portion. The outer coating portion is multi-layer, comprising 6–48 discrete stacked layers and a total outer coating portion thickness in the range of about 2.5–25 microns.

6 Claims, 4 Drawing Sheets

ARTICLE WITH TAILORABLE HIGH TEMPERATURE COATING

BACKGROUND OF THE INVENTION

1. Field of the Invention

This invention relates to coating protection of components or articles for power generating apparatus, and more particularly to the reduction of heat load on and resistance to surface degradation of components.

2. Discussion of the Prior Art

One type of power generating apparatus including a section operating at high temperatures is the gas turbine engine. As gas turbine engine technology advanced, desirable design operating conditions in the hot operating sections of the engine exceeded the temperature capability of the alloys from which engine components were manufactured. Generally, such hot operating components are manufactured from materials frequently referred to as high temperature superalloys primarily based on Ni or Co or both.

It is widely practiced in the art to include internal air cooling passages in the interior of the component, with surface connected air cooling discharge ports. This arrangement reduces heat load on the component and enables the design of outer surface film cooling. One example of an air cooled gas turbine engine component in the form of a blading member is in U.S. Pat. No. 5,503,527—Lee et al. (patented Apr. 2, 1996). However, use of engine air for air cooling is at the expense of and can reduce performance potential. It is desirable, therefore, to reduce some of the heat load on the component other than through the use of cooling air.

One source of heat energy experienced by a component such as in the turbine and exhaust sections of a gas turbine engine is radiant heat energy from an upstream combustor. Such energy is in a frequency range that can increase substrate temperature and heat load on the article, and decrease article life. A multi-layer coating applied to a substrate and which reflects such heat energy from the component surface has been reported to provide reduction in heat load on the article. Such a coating is described in U.S. Pat. No. 5,851,679—Stowell et al. (patented Dec. 22, 1998).

In addition to such thermal exposure and heat load problems on a gas turbine engine component is the effect of a strenuous gas stream environment on an article surface, generally in the temperature range of about 1400–2000° F. Downstream of a combustor, the engine gas stream includes high temperature oxygen along with products of fuel combustion with corrosive and sulfidizing elements, all of which can adversely affect the surface of a component. Therefore, a combination evolved of air cooling to reduce to component temperature and heat load on the component, along with surface environmental protection from oxidation, corrosion and sulfidation, generally in the form of environmental resistant coatings. Engine operating experience has shown that direct exposure of the coatings to such strenuous operating conditions results in coating degradation, including oxidation, and requires periodic repair or replacement of such coatings Environmental resistant coatings for gas turbine engines, many including Al, have been used and widely reported. These include U.S. Pat. No. 3,667,985—Levine et al (patented Jun. 6, 1972) relating to the commercially available Codep aluminide type of coating; U.S. Pat. No. 4,313,760—Dardi, et al (patented Feb. 2, 1982) relating to the commercial M—Cr—Al type of coating, in which M refers to at least one of Ni, Co, and Fe, and with which has been included additional elements, alone or in combination, such as Y, Hf, and Pt; and U.S. Pat. No. 5,658,614—Basta et al (patented Aug. 19, 1997) relating to the Pt—Al type of coating widely used in the gas turbine art.

In addition to the effect of temperature and chemical environment on gas turbine engine components during operation is the effect of abrasive particles carried in the engine gas stream and impinging on the component surface. Such impingement can lead to an increase in surface roughness and accumulation of deposits that can result in performance degradation and design limitations. For example, in one typical engine operation, the surface roughness of a turbine blade airfoil surface can change from about 50 micro-inch to over 200 micro-inch after about 4000 hours service. As a result of such degradation, the skin friction and aerodynamic drag increase. In addition, the heat transfer to the airfoil can double and metal surface temperature can increase over 100 degrees Fahrenheit. Such doubling of the heat load either significantly reduces life of the component or causes the designer of the component to design to meet the higher heat load with a higher cooling flow rate, thereby foregoing greater performance possibilities. Therefore, use of a protective dielectric coating has been proposed to reduce such particle deposits by reducing the magnitude of an electrostatic force that attracts particles flowing through the engine to the surface of a component. This has been discussed in co-pending patent application Ser. No. 09/191,824—Ackerman, et al., filed Nov. 13, 1998.

As was mentioned, after periods of operation in an engine, normal wear and deterioration of the environmental protective coating has been seen to occur. This is the result of contact directly with abrasive particles as well as with such elements that are oxidizing and sulfidizing in the products of combustion or with oxygen diffusing through an outer layer such as the above described dielectric coating. Provision of a coating that resists degradation from the combination of particle impingement and attachment, direct environmental attack, diffusion of adverse environmental elements through a coating system, and exposure to heat energy which can increase heat load on an article, can increase component life and allow a designer to improve engine performance.

BRIEF SUMMARY OF THE INVENTION

A coated article comprises an article substrate and a high temperature coating on the substrate, the coating comprising an inner environmental resistant coating portion, including Al, on the substrate, and an outer heat energy reflecting and oxygen diffusion inhibiting coating portion. The outer coating portion is multi-layer, comprising 6–48 discrete stacked layers, the total thickness of the stack being in the range of about 2.5–25 microns.

DETAILED DESCRIPTION OF THE INVENTION

Figure 1:
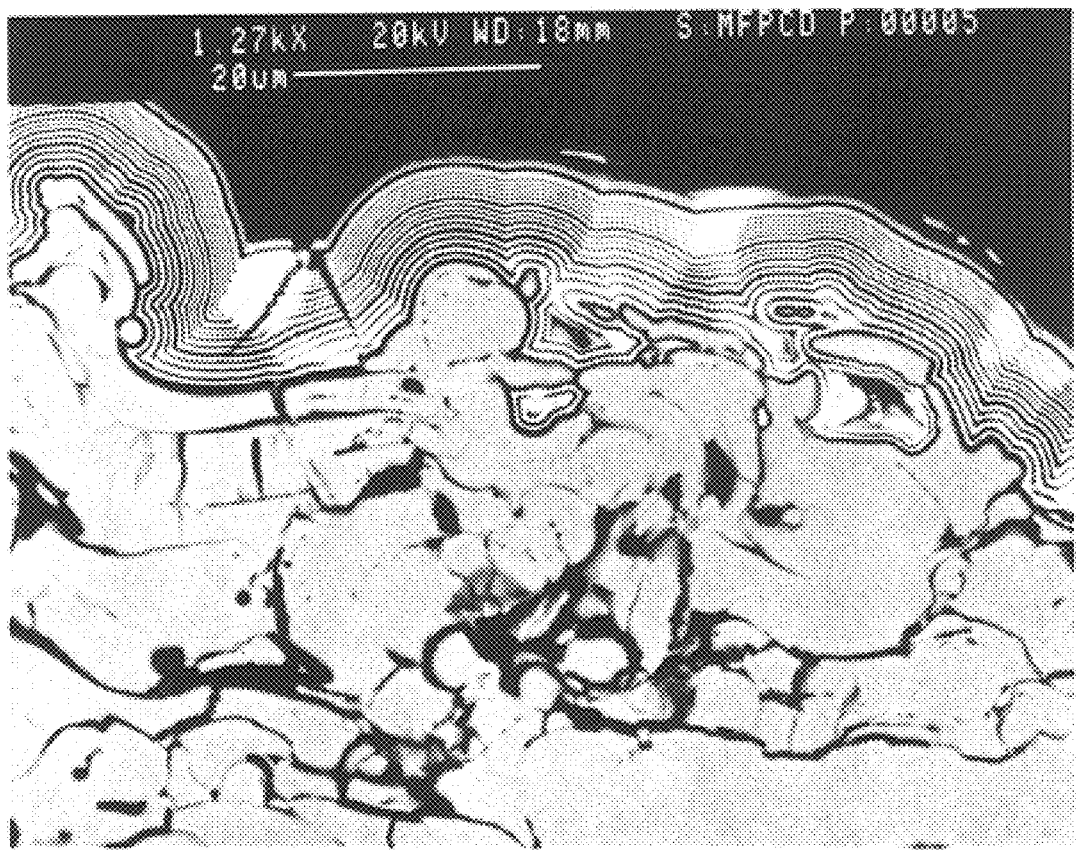
FIG. 1 is a photomicrograph showing the multi-layer outer portion of the high temperature coating on a substrate.

When an environmental resistant coating of the above described types experiences the strenuous operating conditions during operation in a gas turbine engine, over time the coating degrades. In part, this is as a result of oxidation of the elements of the coating and of elements that diffuse into the coating from the underlying substrate. For example, Al converts to aluminum oxide, mixed with oxides of such diffusing elements as Ni and Ti, generally included in Ni base superalloy substrates. This complex combination of oxides can be relatively unstable and, during the cyclic type of operation in a gas turbine engine, can become stressed and erode from an article surface.

One feature of the coating combination of the present invention is an inner environmental resistant coating portion that includes Al and that, in combination with a particular multi-layer outer coating portion, results in the formation of a more stable, relatively undiluted and adherent aluminum oxide at the inner portion. Formation of such an oxide at the surface of the inner portion of the coating is the result of a lower partial pressure for oxygen after diffusing through the multi-layer outer portion. The partial pressure of oxygen is reduced because the multi-layer outer portion functions as a labyrinth through which the oxygen must pass in diffusing from the gas stream toward the substrate. Oxygen at such reduced partial pressure resists formation of oxides of such elements as Ni and Ti. A more stable aluminum oxide and the avoidance of formation of oxides of elements diffusing from the substrate avoids loss of, and increases the life of, the environmental resistant coating.

The coating combination of the present invention includes a multi-layer outer coating portion outward from the above-described inner portion. The outer coating portion is a heat energy reflecting coating generally related to the type described in the above-identified U.S. Pat. No. 5,851,679. However as described below, it is of a different kind which can adhere and function at temperatures as high as about 2000° F. as well as reflect heat energy in the frequency range of up to about 5 microns, and more particularly in the range of about 0.8–2.7 microns. Such a range is of particular interest in the hot operating sections of a modern gas turbine engine downstream of a combustor.

Features of the outer coating portion according to the coating combination of the present invention include a total outer coating thickness in the range of 2.5–25 microns along with 6–48 discrete stacked layers. Such combination of total thickness and number of layers provides sufficient reflectance of heat energy in the frequency range of interest in a gas turbine engine to reduce the heat load on the coated article. In addition, it avoids a total thickness that would result in spalling of the outer portion from the coating combination. At the same time, the number of layers provides the desired oxygen pressure drop as described above.

A gas turbine engine turbine article including an airfoil, for example of a blade, vane, or strut, was used in an evaluation of the present invention. Such an article herein is called a blading member. It was believed that a single layer alone, for example of a thickness of about 1 micron, can reduce the partial pressure of oxygen as it diffuses through the outer layer. However, it was recognized that less than 6 layers were insufficient to reflect adequate heat energy particularly in the frequency range of about 0.8–2.7 microns. In addition, it was recognized that greater than 48 layers and a total outer portion thickness of greater than 25 microns resulted in film stresses sufficiently high to result in spalling of the outer coating portion as a result of the cyclic operating conditions of the hot operating turbine section of a gas turbine engine. A preferred form of the present invention is used on turbine articles, for example on airfoils of blading members such as turbine blades, vanes and struts. Such preferred form includes an outer coating portion comprising 20–30 stacked layers at a total thickness of 2.5–15 microns to reflect heat energy in the frequency range of 0.8–2.7 microns. In a more specific preferred form of the present invention for gas turbine engine turbine component use, the outer coating portion comprises layers of substantially alternating pairs of materials, each pair with an optical thickness to reflect about a one half wave length. For such application in reflecting heat energy in the frequency range of 0.8–2.7 microns, it is preferred that each of the alternating layers has a thickness in the range of about 0.05–1.2 microns. Less than about 0.05 micron reflects energy in the ultraviolet range rather than in the infrared range desired. At a thickness greater than about 1.2 micron, detrimental nodules of material tend to form in a layer. The specific thickness of each layer is determined for the heat energy frequency range desired to be reflected, inversely proportional to the index of refraction of the material of the layer.

The photomicrograph of FIG. 1 shows one form of the multi-layer stacked outer coating portion of the present invention and how it conforms to the surface to which it had been applied. The total thickness of the multi-layer outer portion in FIG. 1 is no greater than 15 microns. In general, as is discussed in the above-identified U.S. Pat. No. 5,851, 679, this general type of coating outer portion can have multiple layers of various materials and layer thickness responsive to radiation peaks for the selected application. In a gas turbine engine turbine section, such spectral peaks relate to vapors or gases of water and carbon dioxide, two common gases found in the products of combustion of such an engine. Accordingly, in FIG. 1 each of the white layers is a high index material, $Ta_2O_5$, and each of the black layers is a low index material, $SiO_2$.

That form of the coating outer portion of the present invention for use in the turbine section of a gas turbine engine provides substantially alternating pairs of high and low index materials, preferably substantially alternating layers of $Ta_2O_5$ and $SiO_2$. In the embodiment of FIG. 1 for application to an airfoil of a gas turbine engine component such as a blade, vane or strut, each $Ta_2O_5$ layer was in the range of 0.1–0.23 microns and each $SiO_2$ layer was in the range of 0.1–0.4 microns, the total outer portion thickness being in the range of about 7.5–15 microns. That preferred combination of high index and low index materials has been found to be particularly advantageous on turbine section components operating at high temperatures: both compounds are very inert with metal substrate surfaces such as Ni base superalloys, and resist attachment with air borne particles. In one series of Becon anti-stick tests on Ni base alloy test pins made of commercial U-720 material, calcium sulfate deposits applied to a coating of sputtered $Al_2O_3$ and a coating of chemical vapor deposited $Ta_2O_5$ readily spalled from each coating. This demonstrated the anti-sticking characteristics of such coating materials.

For use at temperatures of about 1400° F. and below, a combination of alternating layers of $TiO_2$ for the high index material and $SiO_2$ for the low index material has been used. Preferred high index materials include $Ta_2O_5$, $TiO_2$, $HfO_2$, NbO and $Y_2O_5$.

Although a variety of low index materials have been proposed for use in such layers, it has been recognized that in connection with the present invention, certain materials can adversely affect the operation of the coating combination and are to be avoided. More specifically, $ZrO_2$ at elevated temperatures such as about 2000° F. in the presence of oxygen can undergo a phase transformation; in addition, it tends to transport oxygen well. Fluoride compounds such as $MgF_2$ and $BaF_2$ have a relatively large coefficient of thermal expansion and at temperature of about 1800° F. and above can generate the fluoride ion which can attack the coating. Preferred low index materials include $SiO_2$ and $Al_2O_3$.

Figure 2:
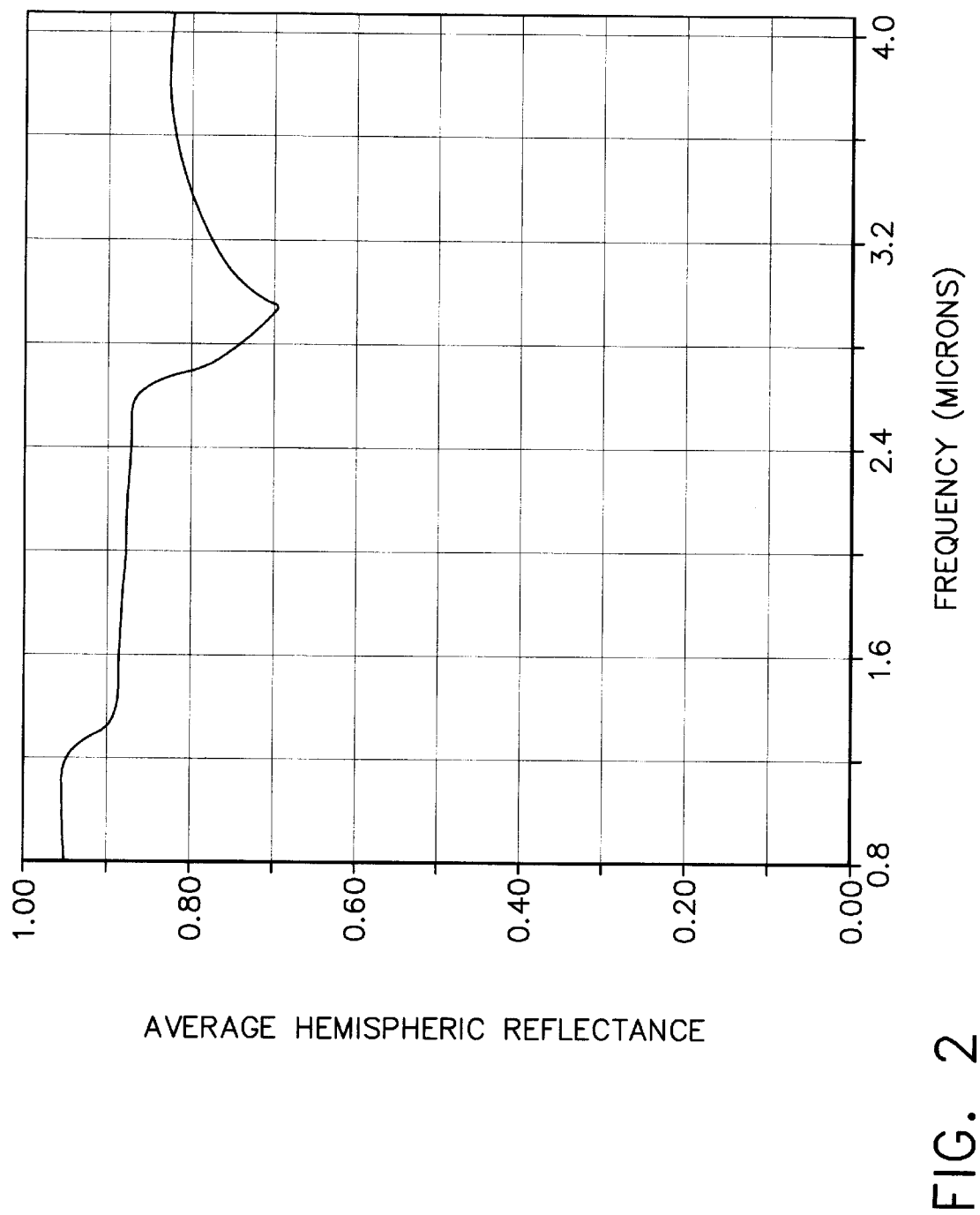
FIG. 2 is a graph that compares the average amount of hemispherical reflectance with heat energy frequency range at a variety of incidence angles and after heat treatment cycling.

The graph of FIG. 2 compares the average amount of hemispherical reflectance from the outer coating portion with the heat energy frequency range of the above-described form of the multi-layer outer coating portion of the present invention preferred for turbine component application. The reflectance data of FIG. 2 were measured at the various incidence angles of 10, 30 and 50 degrees after treatment by furnace cycling of coated specimens. Such cycling included 69 cycles to 2000° F. and 20 cycles to 2100° F., a furnace cycle including 45 minutes in the hot portion of the furnace and 15 minutes of air cooling. The specimens were made of a Ni base superalloy identified as N-4 alloy and the multi-layer outer coating portion was that shown in FIG. 1. Testing included directing heat energy at the coated surfaces and measuring the amount reflectance in each example. The curve in FIG. 2 is an average of such testing at such incidence angles for such heat treatment conditions.

The data of FIG. 2 show an average of at least about 90% hemispherical reflectance in a frequency range of about 0.8–2.7 microns, even after thermal cycling at least as strenuous as might be experienced in an engine. In the hemispherical reflectance test, a specimen is placed within a gold-coated sphere that includes a port for incoming waves and a port with a detector for making measurements.

Figure 3:
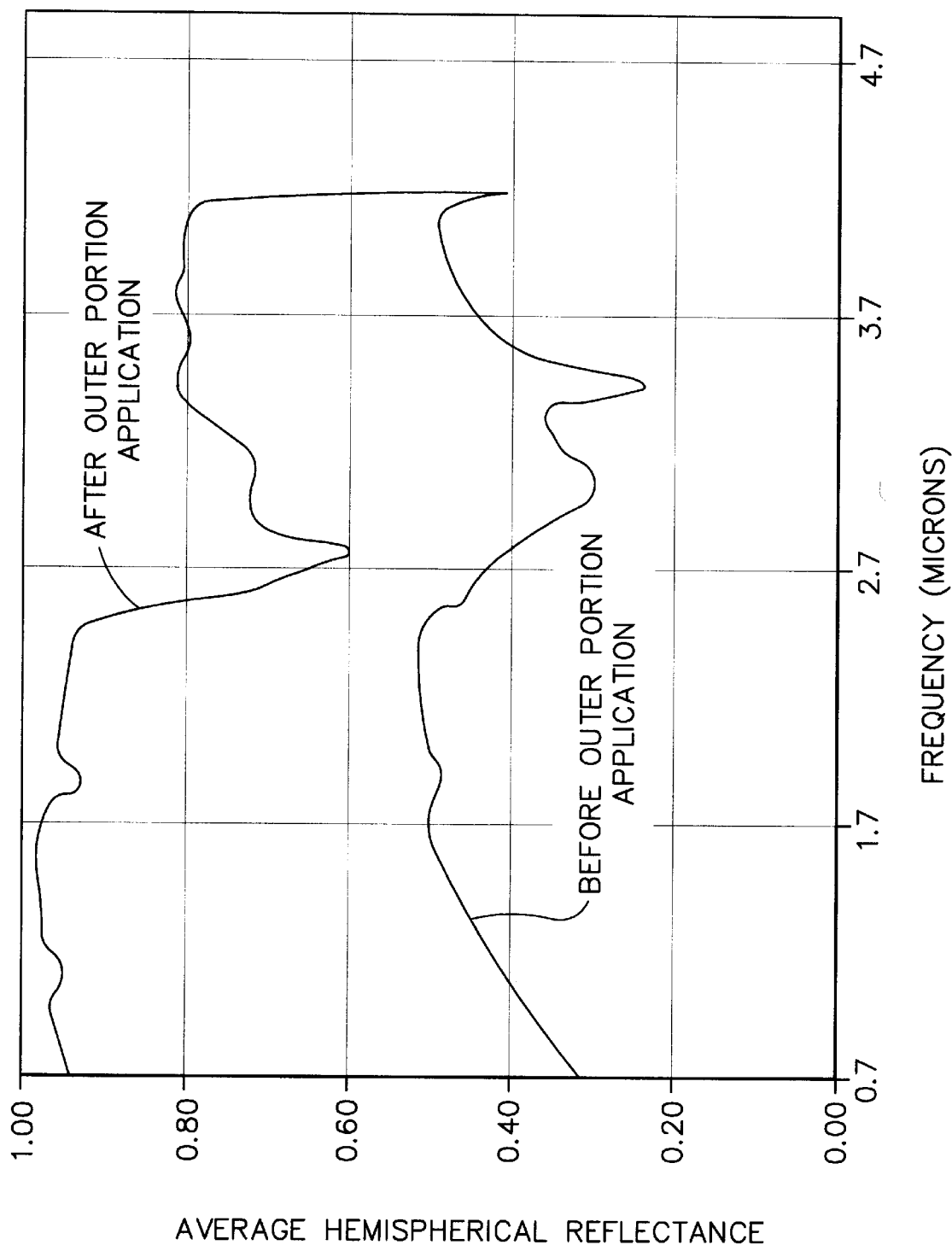
FIG. 3 is a graph as in FIG. 2 comparing the average amount of hemispherical reflectance before and after application of the multi-layer outer portion.

FIG. 3 shows the data as in FIG. 2 before and after application of the preferred multi-layer outer coating portion of the present invention to a combustor component surface. Application of the outer portion increased the reflectance from the outer portion from an average of about 30–50% to an average of about 90%.

Figure 4:
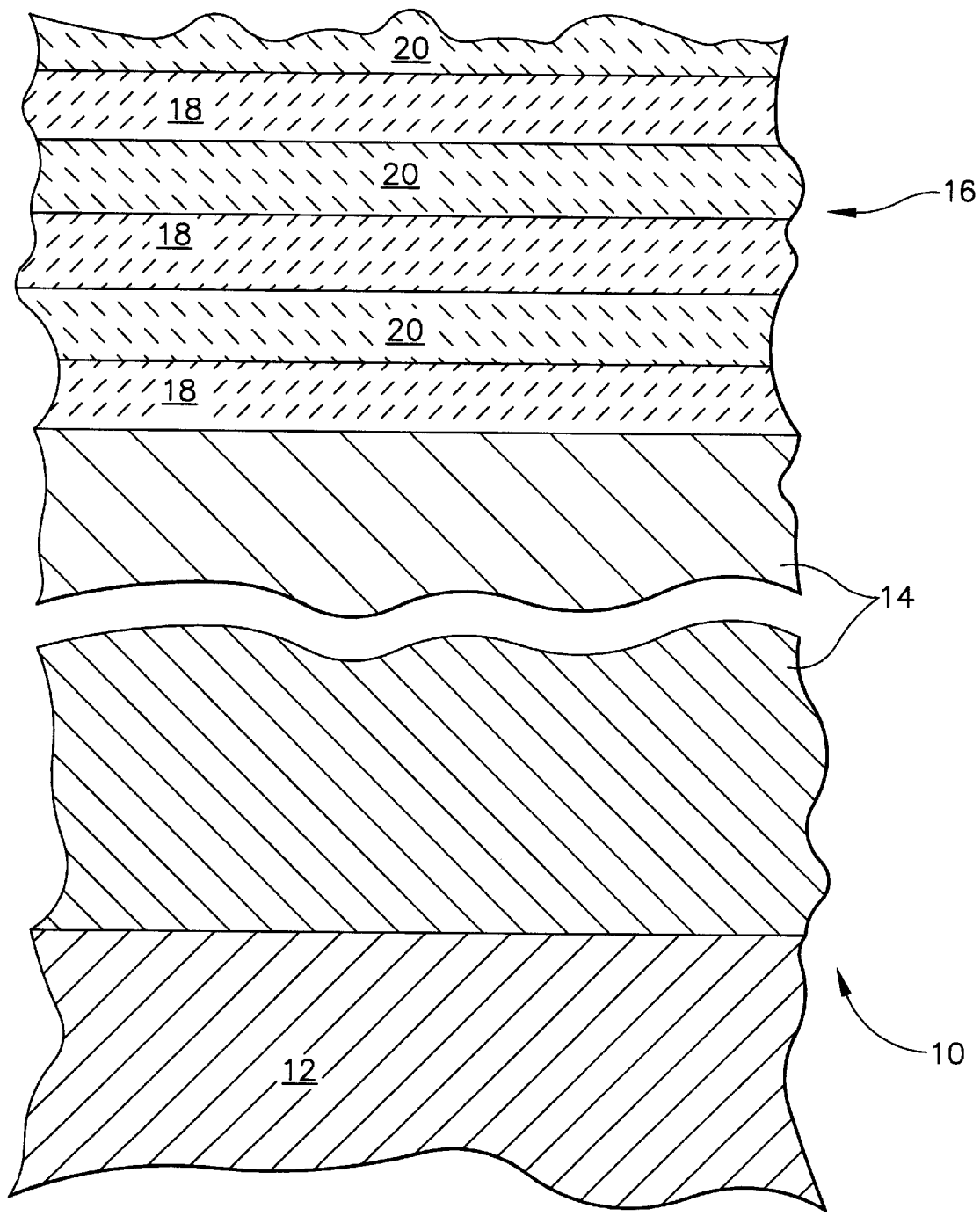
FIG. 4 is a diagrammatic, enlarged, fragmentary, sectional view showing a substrate of an article with an inner environmental resistant coating portion and a multi-layer outer coating portion on the inner coating portion.

FIG. 4 is a diagrammatic, enlarged, fragmentary, sectional view of a portion of a coated article shown generally at 10, according to one form of the present invention, as a composite based on specimen photomicrographs 99-2467 and 059101. The article includes a substrate 12 of a Ni base superalloy sometimes called Rene' N5 alloy, forms of which are more generally described in U.S. Pat. No. 5,173,255—Ross et al (patented Dec. 22, 1992). Disposed on substrate 12 is an inner environmental resistant coating portion 14 of a Pt—Al coating. Coating 14, including Al, was provided on substrate 12 by first electrodepositing Pt on the substrate and then aluminiding the Pt layer. One form of aluminiding used is commercially available as Codep coating method, a form of which is described in the above identified U.S. Pat. No. 3,667,985—Levine et al.

Deposited over inner coating portion 14 is a multi-layer outer coating portion shown generally at 16, deposited by the commercial chemical vapor deposition process. Outer coating portion 16 had a total thickness of about 7–8 microns and included twelve alternating stacked layers of $Ta_2O_5$, shown at 18, and of $SiO_2$, shown at 20. Each of the layers 18 and 20 had a thickness in the range of about 0.05–1.2 microns.

The present invention has been described in connection with specific examples, embodiments, materials, etc. However, it should be understood that they are intended to be representative of rather than in any way limiting on the scope of the invention. Those skilled in the various arts involved will understand that the invention is capable of variations and modifications without departing from the scope of the appended claims.

What is claimed is:

1. A coated article comprising:

a substrate of an alloy based on at least one element selected from the group consisting of Ni and Co;

an inner environmental resistant coating portion including Al on the substrate; and, an outer heat energy reflecting and oxygen diffusion inhibiting coating portion, the outer coating portion:
   a. being multi-layered;
   b. comprising 6–48 stacked layers; and,
   c. having a total thickness in the range of about 2.5–25 microns;

the outer coating portion comprising alternating layers of:
   a. at least one high index material selected from the group consisting of $Ta_2O_5$, $TiO_2$, $HfO_2$, NbO, and $Y_2O_5$; and,
   b. at least one low index material selected from the group consisting of $SiO_2$ and $Al_2O_3$.

2. The article of claim 1 in which:

the substrate is a Ni base superalloy;

the article is a gas turbine engine blading member;

the outer coating portion comprises:
   a. 20–30 stacked layers;
   b. the total thickness of the layers is in the range of about 7.5–15 microns, each layer having a thickness in the range of about 0.05–1.2 microns.

3. The gas turbine engine blading member of claim 2 in which the high index material is $Ta_2O_5$ and the low index material is $SiO_2$.

4. A coated gas turbine engine turbine blading member including an airfoil, the airfoil comprising:

a Ni base superalloy substrate;

an inner environmental resistant coating portion including Al on the substrate, the inner coating portion being selected from the group consisting of aluminide, M—Cr—Al, and Pt—Al coatings; and, an outer heat energy reflecting and oxygen inhibiting coating portion on the inner portion, the outer coating portion:
   a. being multi-layered comprising 20–30 stacked layers, each layer having a thickness in the range of about 0.05–1.2 microns; and,
   b. having a total thickness in the range of about 7.5–15 microns.

5. The blading member of claim 4 in which the outer coating portion comprises substantially alternating layers of:

at least one high index material selected from the group consisting of $Ta_2O_5$, $TiO_2$, $HfO_2$, NbO and $Y_2O_3$; and, at least one low index material selected from the group consisting of $SiO_2$ and $Al_2O_3$.

6. The blading member of claim 5 in which;

the high index material is $Ta_2O_5$;

the low index material is $SiO_2$;

the thickness of each $TaO_2O_5$ layer is in the range of about 0.1–0.23 microns; and, the thickness of each $SiO_2$ layer is in the range of about 0.1–0.4 microns.

* * * * *